United States Patent
Weng et al.

(10) Patent No.: US 7,304,464 B2
(45) Date of Patent: Dec. 4, 2007

(54) SWITCHING VOLTAGE REGULATOR WITH LOW CURRENT TRICKLE MODE

(75) Inventors: Matthew Weng, San Ramon, CA (US); Charles Vinn, Milpitas, CA (US)

(73) Assignee: Micrel, Inc., San Jose, CA (US)

( * ) Notice: Subject to any disclaimer, the term of this patent is extended or adjusted under 35 U.S.C. 154(b) by 76 days.

(21) Appl. No.: 11/376,929

(22) Filed: Mar. 15, 2006

(65) Prior Publication Data
US 2007/0216372 A1   Sep. 20, 2007

(51) Int. Cl.
*G05F 1/40* (2006.01)
(52) U.S. Cl. .................. 323/285; 323/225; 323/284
(58) Field of Classification Search ............... 323/225, 323/282, 283, 284, 285, 290, 351, 273, 274
See application file for complete search history.

(56) References Cited
U.S. PATENT DOCUMENTS 5,481,178 A   1/1996   Wilcox et al.
5,773,966 A *  6/1998  Steigerwald ............... 323/284
6,150,798 A * 11/2000  Ferry et al. ................. 323/273
6,452,368 B1* 9/2002  Basso et al. ................ 323/282
6,621,256 B2* 9/2003  Muratov et al. ........... 323/282

* cited by examiner

*Primary Examiner*—Jessica Han
(74) *Attorney, Agent, or Firm*—Patent Law Group LLP; Brian D. Ogonowsky

(57) ABSTRACT

For load currents greater than a threshold current, the voltage regulator operates in a conventional manner by fully turning on and off one or more switching transistors at a duty cycle necessary to maintain the output voltage a regulated voltage. Upon a load current below a threshold being detected, a controller stops the switching of the transistor(s) and applies a reduced drive signal to the high side transistor so as to apply a constant trickle current to the load. Unnecessary components are shut down to save power. When the output voltage falls below a threshold, the normal switching routine is resumed to recharge the regulator's output capacitor to a certain level, and the regulator once again enters the light load current mode. By not completely shutting down the transistors at light load currents, as in done in a conventional intermittent-operation mode, there is lower power loss by less frequent switching of the transistor(s).

26 Claims, 4 Drawing Sheets

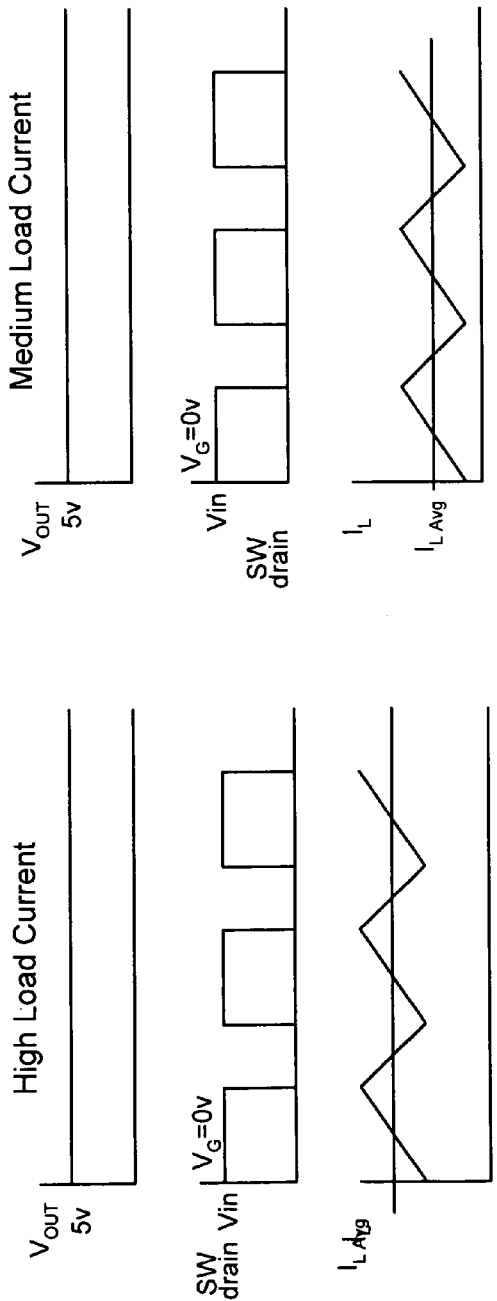
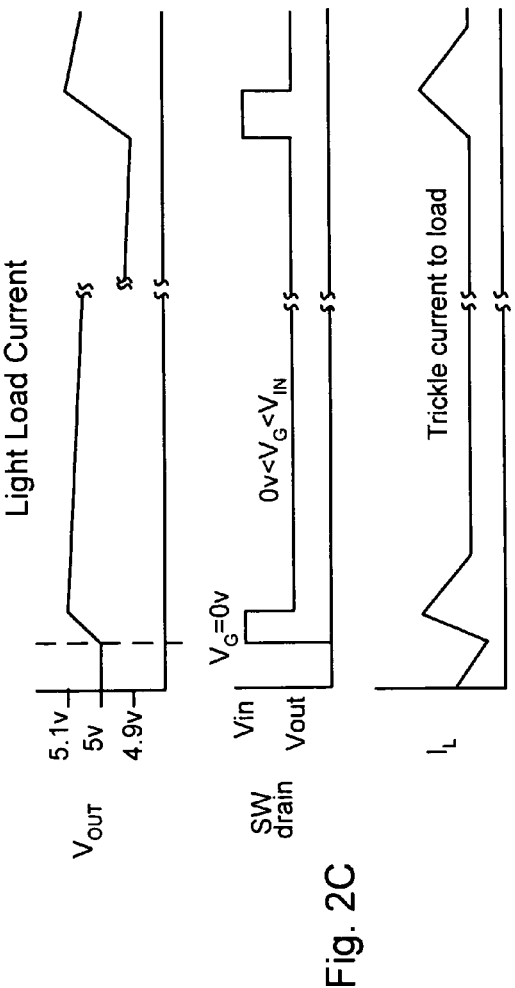
Fig. 2A
Fig. 2B
Fig. 2C

SWITCHING VOLTAGE REGULATOR WITH LOW CURRENT TRICKLE MODE

FIELD OF THE INVENTION

This invention relates to voltage regulators and, in particular, to a technique for operating a voltage regulator in a light load current mode to save energy.

BACKGROUND

Switching voltage regulators are well known. In one type of step down switching regulator, a high side switching transistor, connected to a power supply voltage, is switched between being fully on and fully off at a controlled duty cycle and at a fixed frequency, where the duty cycle is adjusted to maintain the output voltage at a specified regulated voltage. The pulsed current from the switching of the transistor is smoothed by a filter typically consisting of a series inductor and a capacitor connected to ground. A diode or synchronous rectifier is in series with the high side transistor and is typically connected to ground. When the high side transistor is off, the current through the energized inductor is conducted by either the diode or the synchronous rectifier. The output capacitor smoothes the triangular inductor current to supply a regulated DC voltage to the load. The average inductor current equals the current flowing into the load.

Many other types of switching regulators are known, such as a regulator using a fixed on-time of the transistor while varying the interval between the on-times.

At medium and high load currents, a switching regulator is very efficient because the switching transistors have very high conductivity when switched on. For example, to fully turn on a high side PMOS transistor, its gate may be connected to ground to achieve a high gate-source voltage (Vgs), and to fully turn off the transistor, its gate may be applied to the power supply voltage Vin so that Vgs is zero. The gate voltage applied to an NMOS low side switch may also be zero volts or Vin to fully turn off or on the NMOS transistor. Since the transistors have a low resistance when on, there is minimal power dissipation in the transistors.

The gates of MOSFETs have a capacitance. When the regulator is supplying medium and high currents to the load, power wasted by charging and discharging the gate(s) at the switching frequency is a trivial component of the overall power used by the regulator and load.

However, at very light load currents, such as when the load is in a standby mode, the power wasted by charging and discharging the gate(s) at the switching frequency is a significant component of the overall power used by the regulator and load. This problem is exacerbated by the fact that loads are frequently in a low power mode for relatively long periods of time. When the power supply is a battery, it is important to prolong the use time of the battery.

It is known to place the regulator into an intermittent-operation mode at light loads. Such a regulator detects that the load current has gone below a current threshold and shuts down the high side transistor until the output voltage has decayed below an output voltage threshold. During the time when the high side transistor is shut down, the output filter capacitor supplies the current to the load. The length of time that the output voltage decays to the threshold voltage depends on the load current. Once the output voltage has decayed to the threshold voltage, the regulator resumes normal operation (a burst of switching cycles) to raise the output voltage to a certain voltage, typically slightly above the nominal regulated voltage, and the regulator goes into its shut down mode again.

Other forms of low load current modes include a mode where the high side transistor is switched at a variable frequency but at a fixed low duty cycle to keep the output voltage within a range of voltages.

In the known types of intermittent-operation mode techniques, the switching transistor is always controlled to be either fully on or fully off. Any switching of the transistor wastes power by the charging and discharging of its gate.

Bipolar transistors also have a parasitic capacitance, where there is wasted power by the switching on and off of the bipolar transistors by the regulator.

It is desirable to even further reduce the power wasted by a regulator when supplying light load currents.

SUMMARY

A new light load current mode technique is described for switching voltage regulators. In one embodiment, the inventive switching regulator reduces the number of switching cycles of the transistors at light load currents, and thus reduces wasted power by charging and discharging the gates of the transistors, by maintaining the high side transistor in a "reduced on" state during the light load current mode to provide a constant trickle current to the load. This is done by applying a reduced gate-source voltage to the high side transistor such that only a small current flows through the transistor. The trickle current should be at or slightly below the lowest current drain expected by the load, such as when in a standby mode. When the output voltage has drooped below a threshold voltage, the normal switching operation of the regulator is resumed to ramp up the output voltage to the starting voltage, such as slightly above the nominal regulated voltage, and the regulator once again enters the light load current mode and supplies a constant trickle current to the load.

Since the load is being supplied a constant trickle current from the power source, in contrast to the prior art methods of turning off the transistors and having the current supplied by the output capacitor, the time that it takes for the output voltage to droop below the threshold voltage is greatly extended. Thus, the time between bursts of the switching cycles to ramp up the voltage is greatly extended. As a result, there is very little current wasted by the charging and discharging of the gates when the regulator is supplying light load currents. Further, since all components used in the switching process are shut down for a longer time, there is very little current used in the light load current mode.

This technique of using a reduced on state to supply a trickle current can be applied to any type of regulator to increase its efficiency. Such regulators include buck, boost, buck-boost, or any other type using any type of transistor, such as bipolar transistors.

BRIEF DESCRIPTION OF THE DRAWINGS

FIGS. 2A, 2B, and 2C illustrate conditions of the regulator of FIG. 1 when supplying high currents, medium currents, and light load currents.

Elements labeled with the same numeral may be identical.

DETAILED DESCRIPTION

Figure 1:
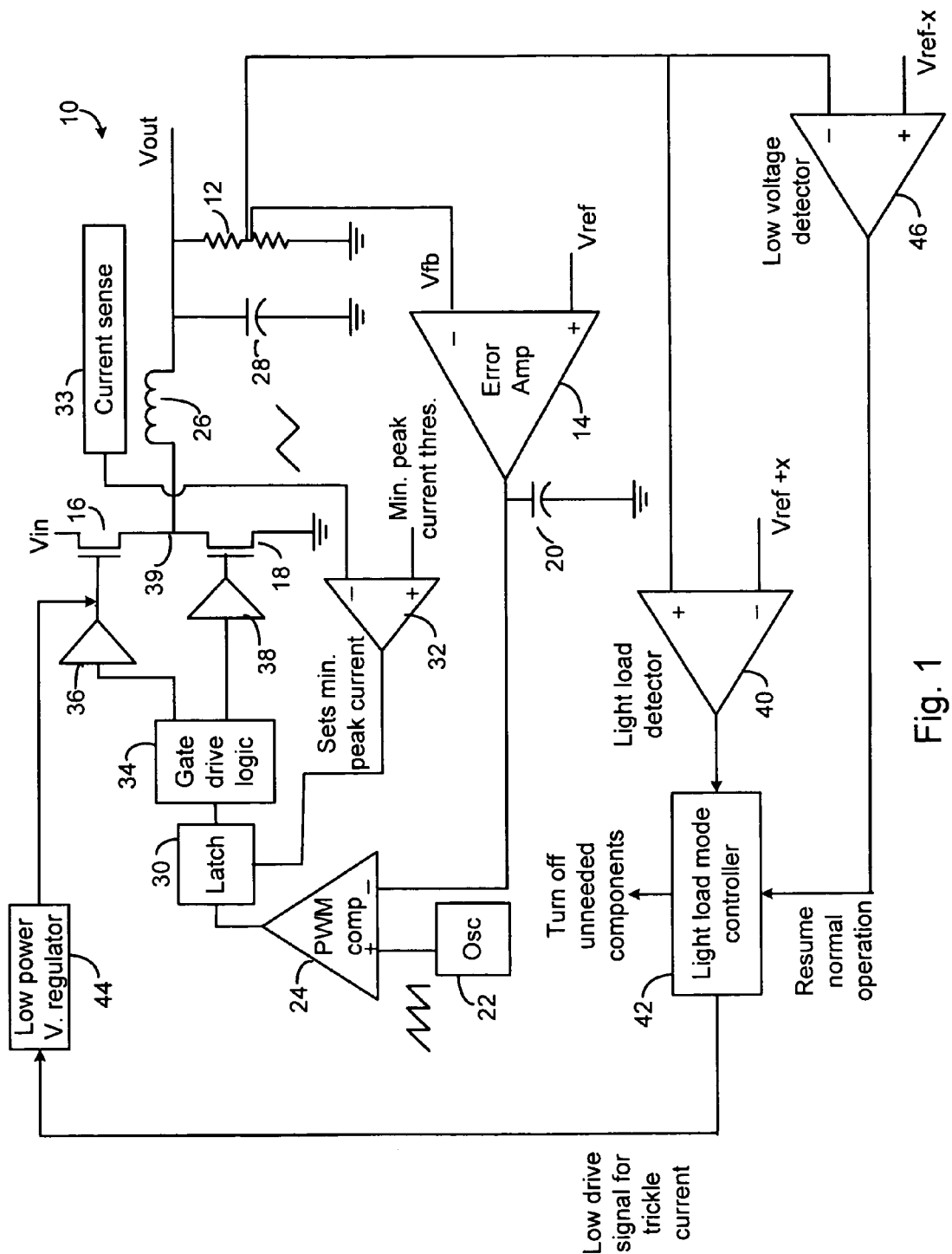
FIG. 1 illustrates a voltage mode regulator incorporating one embodiment of the inventive light load current mode technique.

FIG. 1 illustrates a voltage mode voltage regulator 10 incorporating a light load current mode feature in accordance with one embodiment of the invention.

A resistor divider 12, connected to the output terminal of the regulator, provides a feedback voltage Vfb to an error amplifier 14. A stable reference voltage Vref is provided to a second input of the error amplifier 14. The regulator 10 adjusts the duty cycle of the switching transistors 16 and 18 to maintain Vfb at the same level as Vref.

The output of the error amplifier 14 is a current that adds and subtracts charge from capacitor 20 such that the capacitor 20 voltage is related to the duty cycle required to achieve the regulated voltage. A higher capacitor voltage corresponds to a higher duty cycle. In a voltage mode regulator, the duty cycle is equal to the ratio of Vout to Vin. Vin may be a battery voltage.

The capacitor voltage is compared to a sawtooth oscillator 22 signal. A pulsewidth modulation (PWM) comparator 24 compares the capacitor voltage to the rising sawtooth voltage. At the beginning of an oscillator cycle, the PMOS transistor 16 is turned fully on with a gate voltage of 0 volts to effectively connect the power supply input voltage Vin to the inductor 26. When the ramp crosses the capacitor 20 voltage, the PMOS transistor 16 is turned off and the synchronous rectifier (NMOS transistor 18) is turned on. The transistors 16 and 18 are synchronously switched in this manner during normal operation. When transistor 16 is on, the inductor 26 gets charged and, when transistor 18 is on, the inductor 26 gets discharged. The ramping up and down of the inductor 26 current is smoothed by an output capacitor 28 to provide a DC voltage output. The average current through the inductor 26 is the current to the load, which is connected to the output terminal labeled Vout.

In this normal mode, a latch 30 receives both the "set" output of the PWM comparator 24 and a signal from a minimum current detector comparator 32 to cause transistor 16 to be on for at least a minimum peak current. The comparator 32 receives a signal corresponding to the ramping current through the transistor 16 and receives a minimum peak current threshold signal. Any load current requiring less current that that corresponding to the minimum peak current threshold will be deemed a "light load current," causing the regulator to enter a light load current mode, described later. The optimal level of the minimum peak current threshold signal may be determined by the particular application of the regulator, such as a level that is triggered by the load entering a standby mode.

The current through transistor 16 may be sensed by a current sensor 33 in any number of conventional ways. These ways include detecting the voltage drop across a low value resistor in series between transistor 16 and inductor 26, detecting the current through a small transistor in parallel with transistor 16, detecting a current through a secondary winding of a transformer where inductor 26 is the primary winding, or other techniques.

Alternately, the load current may be directly detected using a low value resistor in series with the Vout terminal and measuring the voltage drop across the resistor. If the voltage drops below a certain threshold value, as determined by a comparator, the regulator is caused to enter its light load current mode. By using that direct detection technique, latch 30, comparator 32, and current sensor 33 are not needed.

Assuming the load current is high, the latch 30 sends a switch signal to a gate drive logic circuit 34 that may delay the switching of one of the transistors 16 and 18 to prevent any current flow between Vin and ground during the transistors' transition between their on and off states.

The drive signals are amplified by drivers 36 and 38, which provide a full on or full off control signal to the gates of transistors 16 and 18. The gate voltages Vg may be either 0 volts or the power supply voltage Vin to ensure full turn on and full turn off. By fully turning on the transistors 16 and 18, there is minimum power dissipation by the transistors due to their low resistivity.

The above-described regulator portion uses conventional techniques.

FIGS. 2A and 2B illustrate the operation of the regulator 10 during its normal mode, assuming that the nominal regulated voltage is 5 volts. In FIG. 2A, the load current is high. Vout stays constant at 5 volts. The "on time" of the high side switch (SW) per cycle (i.e., the duty cycle) is determined by the ratio of Vout to Vin. The SW drain voltage graph illustrates the approximate voltage at the drain of the PMOS transistor at node 39, where the switch is turned fully on with a Vg of 0 volts (node 39 is at approximately Vin) and fully turned off with a Vg at or near Vin (node 39 near ground due to transistor 18 being on). The inductor 26 current $I_L$ ramps up and down with the synchronous switching of the transistors 16 and 18. The average current $I_{L\ Avg}$ is the load current. FIG. 2B illustrates the same parameters at a medium load current. Note that the only difference is the average inductor current.

If the load starts drawing a light current, below the threshold for the regulator 10 to enter its light load current mode, the following happens. The minimum peak current comparator 32 causes the latch 30 to keep the transistor 16 on for a time after the PWM comparator 24 shut off signal until the minimum peak current has been reached. This "excess" inductor current during each switching cycle will incrementally increase Vout to above the nominal Vout of 5 volts. A light load detector 40 compares Vfb to a threshold voltage (Vref+x) that is slightly above the Vref applied to the error amplifier 14. When Vfb has risen above the threshold level, detector 40 signals the regulator 10 that the load current is light and that the regulator 10 should enter its light load current mode.

The output of detector 40 is applied to a light load mode controller 42, which may be a very simple switching circuit. When a light load current is detected, the controller 42 controls regulator 10 to stop switching the transistors 16 and 18. This may be accomplished by removing all power to the error amplifier 14, oscillator 22, PWM comparator 24, latch 30, logic 34, and drivers 36 and 38. Removing all power to these components may be performed by controlling a switch coupling power to those components. Shutting down all unnecessary components also saves power during the light load current mode. Additional non-required components may also be shut down. The controller 42 also causes a low level drive signal to be applied to the gate of transistor 16 to keep transistor 16 in a "reduced on" state to generate a small trickle current to the load. One way to do this is to enable a low power voltage regulator 44 that is connected to the gate of transistor 16. For example, if a full on condition of transistor 16, controlled by driver 36, uses a gate voltage of 0 volts to provided the highest Vgs voltage (e.g., 7 volts), the low power voltage regulator 44 may provide a Vgs of only 1 volt, where the gate voltage is only 1 volt below Vin. The low power regulator 44 may be a linear regulator using Vin as the input voltage.

The synchronous rectifier 18 must be shut down in the light load current mode to avoid shorting Vin to ground. A diode may be used in place of, or in parallel with, a synchronous rectifier.

The trickle current may be only a few milliamps or even microamps.

Since the trickle current is a DC current, the inductor 26 will basically act as a short circuit.

If the light load current is greater than the constant trickle current, the output voltage Vout will slowly drop. A low voltage detector 46 (a comparator) is connected to Vfb and to a voltage (Vref–x) slightly below Vref. If Vfb goes below Vref–x, it signals to the light load mode controller 42 to turn back on the switching circuitry and stop the low level drive signal to transistor 16. Normal switching then resumes. If the load current is still light, Vout will rise again to be above the threshold, and the light load current mode will be initiated again. Detectors 40 and 46 may actually be a single hysteretic comparator that keeps Vout between two voltages.

The regulator 10 may also include an overvoltage detector (not shown) that automatically shuts off the transistor 16 in the event that Vout rises above a threshold while the regulator 10 is in the light load current mode, indicating that the trickle current is more than the load needs. In such a case, the shutting down of the transistor 16 causes Vout to drop until a lower threshold is reached. At that time, the switching mode resumes, followed by the light load current mode. In another embodiment, the drive signal that sets the trickle current is automatically adjusted using feedback to prevent Vout from increasing during the light load current mode.

FIG. 2C illustrates certain parameters of the regulator 10 in the light load current mode. The Vout graph shows the regulator 10 entering into the light load current mode when the switching of transistor 16 causes Vout to exceed a threshold of 5.1 volts. The threshold can be any amount over the nominal voltage. As previous mentioned, the light load mode can be triggered in any number of other ways, such as by directly detecting the current to the load.

After the high threshold of Vout is reached, the controller 42 applies a reduced drive signal to transistor 16. As illustrated in FIG. 2C, the transistor 16 switch (SW) is driven to a "reduced on" state to provide a trickle current. The trickle current may be any level below the minimum current achievable in the normal mode. The closer the trickle current is to the current used by the load, the longer the periods between the switching of the transistors to recharge the output capacitor 28. In one embodiment, the trickle current is 1/10 or less of the DC output current generated in the normal mode when the regulator is generating the minimum peak threshold current. In the SW drain graph of FIG. 2C, when the switch is controlled to provide a trickle current, the inductor 26 is a short circuit and the node 39 is at approximately Vout. Vout will vary over time depending on the difference between the trickle current and the load current.

When Vout has dropped to a low threshold, the switching resumes until Vout has risen to the high threshold, and the light load current mode is again enabled.

Figure 3:
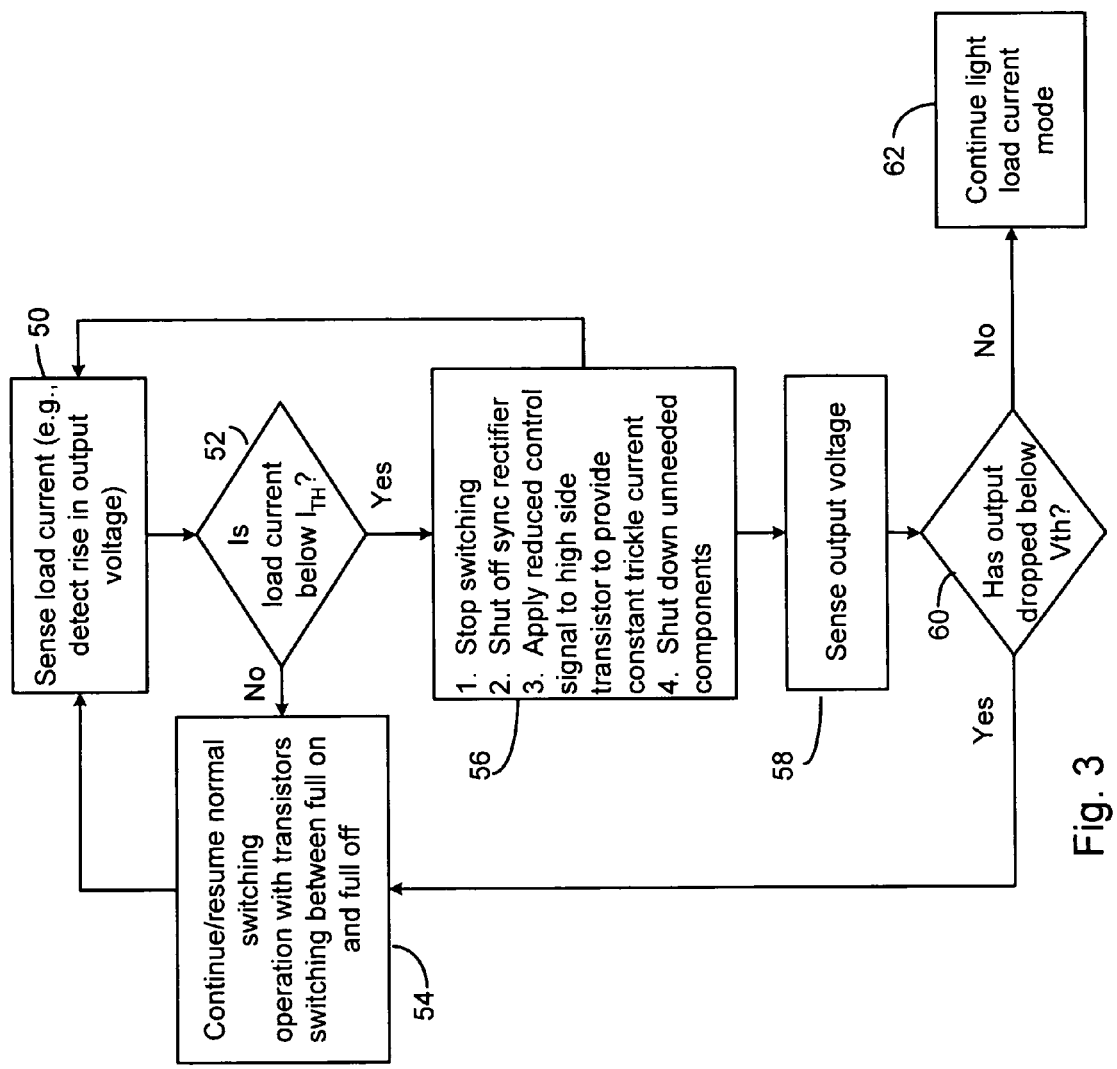
FIG. 3 is a flowchart of one routine for detecting a light load condition and operating the regulator in the light load current mode.

FIG. 3 is a flowchart of the basic process described above. In step 50, the load current is sensed in any manner to determine if the load current is below a light load current threshold (step 52). If the load current is not below the threshold, normal switching of the transistors is conducted (step 54). Any type of switching regulator may be used for supplying a regulated voltage above the light load current threshold. Various types of suitable switching regulators are described in U.S. Pat. No. 5,481,178, incorporated herein by reference.

If it is detected that the load current is below the light load current threshold, in step 56 the regulator is caused to: 1) stop switching; 2) shut off any synchronous rectifier; 3) apply a reduced drive signal to the control terminal of the high side switch to generate a small, continuous trickle current for the load; and 4) shut down unneeded components to save power.

In step 58, the output voltage is sensed. In step 60, it is determined if the output voltage has dropped below a threshold. If so, the normal switching operation is resumed (step 54). If not, the light load current mode continues (step 62).

Instead of MOSFETs, any other type of switching transistor may be used, such as bipolar transistors. As is well known, a bipolar transistor has a parasitic capacitor that must be charged and discharged when switching the transistor.

The light load current feature of the present invention minimizes the number of switching cycles needed to maintain the regulated voltage during a light load current condition. This saves power by reducing the frequency of charging and discharging the switching transistor when turning the transistor on and off.

Figure 4:
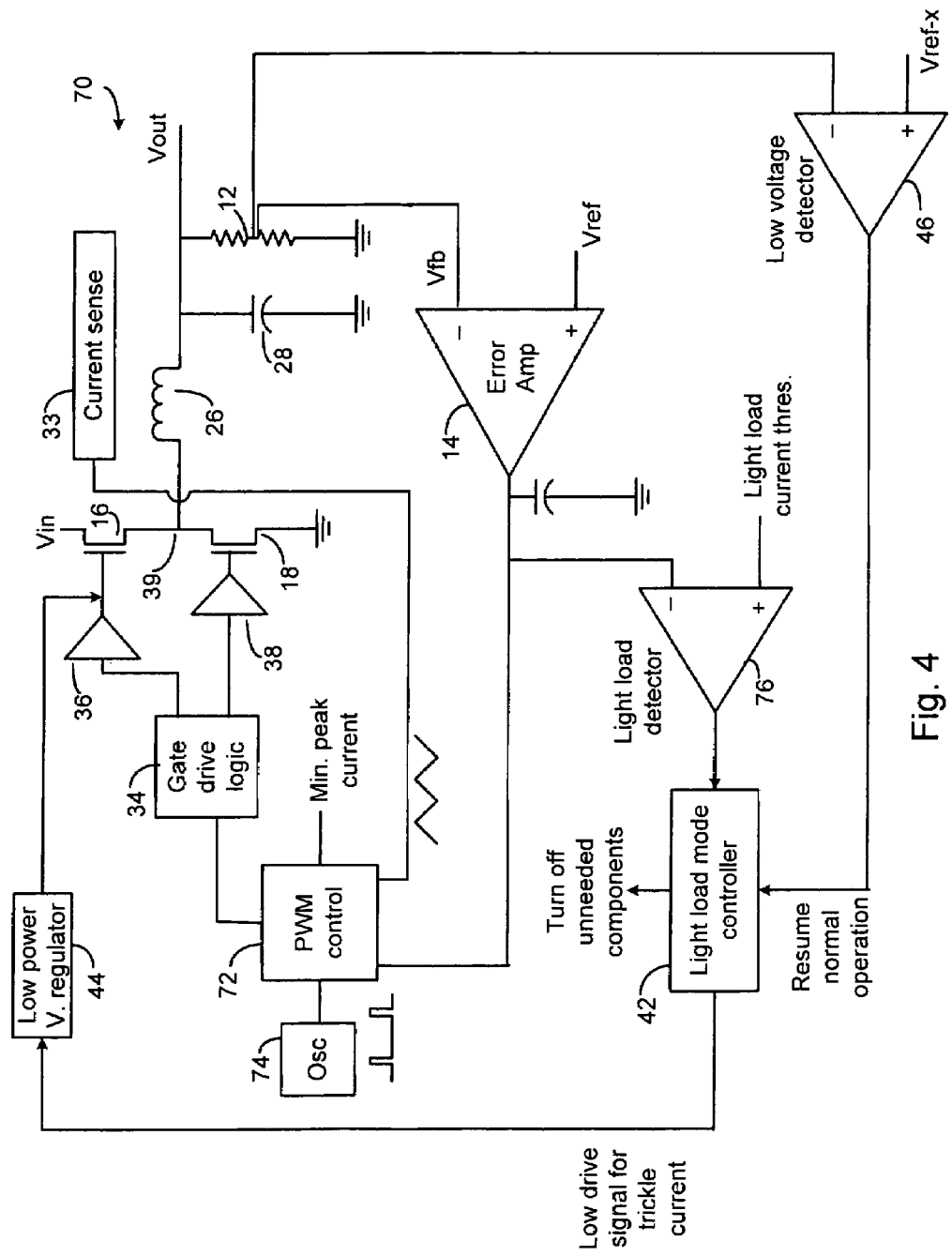
FIG. 4 illustrates a current mode regulator incorporating one embodiment of the inventive light load current mode technique.

FIG. 4 illustrates the invention being incorporated into a current mode regulator 70.

In a current mode regulator, the duty cycle is controlled to generate the current needed during each switch cycle to maintain a constant regulated voltage. The instantaneous current through the inductor 26 is sensed by a current sensor 33. A PWM controller 72 receives an error amplifier signal 14, the current signal from the current sensor 33, a pulse train from an oscillator 74, and a signal enforcing a minimum peak current. The oscillator pulse turns on the high side transistor 16 and turns off the low side transistor 18. When the ramping instantaneous current crosses the error amplifier 14 signal, the PWM controller 72 controls transistor 16 to turn off and transistor 18 to turn on. This process repeats for each oscillator cycle.

At low load currents, the minimum peak current signal applied to the PWM controller 72 causes transistor 16 to conduct a minimum peak current higher that that needed by the load. This will cause the output capacitor 28 to charge to a voltage above the nominal regulated voltage. When the rising Vfb exceeds Vref, the output of the error amplifier 14 goes below a threshold sensed by the light load detector 76. This signals the light load mode controller 42 to control the regulator 70 to enter a light load current mode, as previously described.

During the light load current mode, the high side transistor 16 will remain in a "reduced on" state to provide a continuous trickle current to the load, which will typically be a current slightly less than the current actually drawn by the load. This will slowly discharge the output capacitor 28, causing Vout and Vfb to drop. The lowering of Vfb below a threshold triggers the low voltage detector 46, which causes the controller 42 to place the regulator 70 in its normal switching mode until the output capacitor 28 is recharged again to the point where the light load current mode is initiated.

In a current mode controller, the minimum peak current may be enforced in many ways.

The switching transistors may be formed on the same chip as the control circuitry or formed on a different chip.

In some embodiments of regulators, such as in a boost configuration, the inductor is directly connected to the supply voltage, and a first switching transistor is connected in series between the inductor and ground. A synchronously switched second transistor is connected between the inductor and the output terminal. In that case, the "reduced on" state of the second transistor in the light load current mode draws current through the inductor, acting like a short circuit, and to the load.

The regulators of FIGS. 1 and 4 comprise: 1) a first controller for providing all of the control functions for switching the one or more transistors fully on and fully off for supplying load currents above a threshold current; and 2) a second controller for providing all of the control functions for operating the regulator in the light load current mode wherein a transistor is maintained in a constant "reduced on" state to supply only a trickle current to the load. The first and second controllers may use some of the same circuitry.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A voltage regulator for regulating a voltage applied to a load drawing a load current, the regulator comprising:
   a switching regulator portion, the switching regulator portion comprising:
      a first controller that receives a feedback signal related to an output voltage of the regulator and switches a first transistor at a duty cycle necessary to maintain an output voltage of the regulator at a regulated voltage when load currents exceed a first threshold current,
      the first controller intermittently applying a first drive signal to the first transistor for turning on the first transistor during times when load currents exceed the first threshold current, and
   a non-switching, non-linear regulator portion comprising:
      a second controller that detects when a load current is below the first threshold current and, in response, stops switching the first transistor and applies a constant second drive signal to the first transistor, different from the first drive signal, to cause the first transistor to conduct a trickle current that is below the first threshold current, the constant second drive signal not varying with changes in the output voltage as the first transistor conducts the trickle current.

2. The regulator of claim 1 wherein the first controller comprises a pulse width modulation (PWM) controller.

3. The regulator of claim 1 wherein the first controller comprises an error amplifier that determines a difference between the feedback signal and a reference signal and wherein the first controller controls the duty cycle to approximately match the feedback signal to the reference signal.

4. The regulator of claim 1 wherein the first controller is a voltage mode controller that only uses a voltage feedback signal to control the duty cycle.

5. The regulator of claim 1 wherein the first controller is a current mode controller that uses a voltage feedback signal and a current feedback signal to control the duty cycle.

6. The regulator of claim 1 further comprising a current sensor that senses current through the first transistor.

7. The regulator of claim 6 wherein the first controller senses a signal from the current sensor and prevents the first transistor from shutting off until a minimum peak current through the first transistor has been reached during a switching cycle, whereby when the load current is below the first threshold level, the output voltage will rise.

8. The regulator of claim 1 further comprising a load current detector for detecting when a load current is below the first current threshold.

9. The regulator of claim 8 wherein the load current detector comprises a comparator that compares a signal corresponding to the output voltage of the regulator to a reference voltage to determine if the output voltage has risen above the reference voltage.

10. The regulator of claim 1 wherein the second controller comprises a voltage source that generates the constant second drive signal for the first transistor.

11. The regulator of claim 1 wherein the first transistor has a first conductivity when receiving the first drive signal and a lower second conductivity when receiving the second drive signal.

12. The regulator of claim 1 wherein the first transistor is a PMOS transistor having a gate, and wherein the second drive signal is a gate voltage greater than zero volts such that the PMOS transistor has a first conductivity when receiving the first drive signal and a lower second conductivity when receiving the second drive signal.

13. The regulator of claim 1 wherein the second controller disables the first controller when applying the constant second drive signal to the first transistor.

14. The regulator of claim 1 wherein the second controller comprises a comparator that detects when the output voltage has fallen below a threshold voltage and, in response, enables the first controller to resume switching of the first transistor.

15. The regulator of claim 1 wherein the regulator is a step down regulator.

16. A method performed by a voltage regulator for regulating a voltage applied to a load drawing a load current, the method comprising:
   receiving a feedback signal related to an output voltage of the regulator;
   switching a first transistor at a duty cycle necessary to maintain an output voltage of the regulator at a regulated voltage when load currents exceed a first threshold current,
   switching the first transistor comprising intermittently applying a first drive signal to the first transistor for turning on the first transistor during times when load currents exceed the first threshold current;
   detecting when a load current is below the first threshold current; and
   in response to detecting when a load current is below the first threshold current, stopping switching the first transistor and applying a constant second drive signal to the first transistor, different from the first drive signal, to cause the first transistor to conduct a trickle current that is below the first threshold current, the constant second drive signal not varying with changes in the output voltage as the first transistor conducts the trickle current.

17. The method of claim 16 wherein switching the first transistor at a duty cycle comprises performing pulse width modulation (PWM).

18. The method of claim 16 wherein switching the first transistor at a duty cycle comprises determining a difference between the feedback signal and a reference signal, using an error amplifier, and controlling the duty cycle to approximately match the feedback signal to the reference signal.

19. The method of claim 16 wherein switching the first transistor at a duty cycle comprises sensing a signal from a current sensor and preventing the first transistor from shutting off until a minimum peak current through the first transistor has been reached during a switching cycle, whereby when the load current is below the first threshold level, the output voltage will rise.

20. The method of claim 16 wherein detecting when a load current is below the first threshold current comprises detecting when the output voltage has risen above a threshold level.

21. The method of claim 16 wherein applying a constant second drive signal to the first transistor comprises applying a voltage source that generates the constant second drive signal to a control terminal of the first transistor.

22. The method of claim 16 wherein the first transistor is a PMOS transistor having a gate, and wherein applying a constant second drive signal comprises applying a gate voltage to the PMOS transistor greater than zero volts.

23. The method of claim 16 wherein the first transistor has a first conductivity when receiving the first drive signal and a lower second conductivity when receiving the second drive signal.

24. The method of claim 16 further comprising disabling components used to switch the first transistor when applying the constant second drive signal to the first transistor.

25. The method of claim 16 further comprising detecting when the output voltage has fallen below a threshold voltage and, in response, resuming switching of the first transistor.

26. The method of claim 16 wherein the regulator is a step down regulator.

* * * * *